United States Patent Office 3,736,229
Patented May 29, 1973

3,736,229
FERMENTATION PROCESS FOR THE PRODUCTION OF D-MANNITOL
John R. De Zeeuw, Stonington, and Edward J. Tynan III, Gales Ferry, Conn., assignors to Pfizer Inc., New York, N.Y.
No Drawing. Filed Feb. 18, 1971, Ser. No. 116,670
Int. Cl. C12d 13/02
U.S. Cl. 195—28 R    4 Claims

ABSTRACT OF THE DISCLOSURE

A process for producing D-mannitol by aerobically fermenting an aqueous hydrocarbon-containing nutrient medium with a new strain of the yeast, *Candida lipolytica*.

BACKGROUND OF THE INVENTION

This invention relates to a process for the production of D-mannitol by fermentation. In particular, it relates to a process for the production of D-mannitol by aerobically fermenting an aqueous hydrocarbon-containing nutrient medium with a new strain of the yeast, *Candida lipolytica*, and isolating the D-mannitol by direct crystallization from the clarified fermentation broth.

D-mannitol is a non-hygroscopic, white crystalline polyhydric alcohol which has a pleasantly sweet taste, being about 65% as sweet as sucrose. It is used as a bodying and texturizing agent in foods. It is useful as an excipient in chewable tablets such as vitamins and aspirin. In addition, D-mannitol is useful in making artificial resins and plasticizers and as an intermediate in the manufacture of the vasodilator D-mannitol hexanitrate. It is also used with boric acid in the manufacture of dry electrolytic condensers for radio applications.

Most of the commercial supply of D-mannitol is produced from sucrose. The sucrose is first hydrolyzed to D-glucose and D-fructose and then reduced, leading to a mixture of sorbitol and D-mannitol in the approximate ratio of 3 to 1. The present relatively high cost of D-mannitol is due in part to the problems associated with separating D-mannitol in high purity from co-produced sorbitol.

Strains of the genus Candida are known to produce various mixtures of the polyhydric alcohols such as glycerol, i-erythritol, D-arabitol and D-mannitol, usually from carbohydrate substrates. There are also numerous reports in the literature describing the propagation of strains of Candida in media containing hydrocarbons as the principle source of assimilable carbon.

This invention provides a fermentation process for the low cost commercial production of D-mannitol from certain widely available hydrocarbons. It utilizes a new strain of *Candida lipolytica* that produces D-mannitol as the main polyol and in such concentrations that it can be directly crystallized from a concentrate of clarified and deionized fermentation broth.

SUMMARY OF THE INVENTION

The present invention now provides a process for producing D-mannitol by aerobically fermenting an aqueous nutrient medium containing a hydrocarbon or mixture of hydrocarbons as the principal source of assimilable carbon with a certain new strain of the genus Candida for about 8 to about 9 days, and recovering the D-mannitol directly by concentrating the filtered and deionized fermentation broth. In particular, this invention comprises a process for producing D-mannitol by aerobically fermenting *Candida lipolytica* ATCC No. 20297 in a nutrient medium containing at least one n-alkane hydrocarbon of from 12 to 18 carbon atoms which is intimately mixed with an aqueous phase containing an assimilable source of nitrogen, minerals and other usual nutrients. In the process of this invention, the concentrations of co-produced D-arabitol and i-erythritol are so low and the concentration of D-mannitol so high as to permit the recovery of pure D-mannitol by direct crystallization from clarified and deionized fermentation broths.

DETAILED DESCRIPTION OF THE INVENTION

It has now been found that a certain strain of the yeast *Candida lipolytica* has the special ability to produce D-mannitol in high concentrations, during the areobic fermentation of aqueous media containing a hydrocarbon or mixture of hydrocarbons as the principal or sole source of assimilable carbon, with the co-production of D-arabitol and i-erythritol in low concentrations. At the present time only the one strain of *Candida lipolytica* is known which permits the easy recovery of D-mannitol in good yield by direct crystallization from concentrated fermentation both. The operable strain has been deposited in a recognized public collection, the American Type Culture Collection, and given the name ATCC No. 20297.

Individual n-alkanes, ranging from dodecane to octadecane, can be used as the sole hydrocarbon in the fermentation medium. Mixtures of hydrocarbons can be used as well, including crude and semi-refined materials, but at least a portion should consist of a hydrocarbon having a chain length of from about 12 to 18 carbon atoms. The hydrocarbon level must be at least about 5% by weight of the medium in order to produce significant concentrations and yields of D-mannitol. Levels up to 20% by weight can be used if desired, but the preferred level is about 15% w./w. for optimum results.

The fermentation medium contains the conventional sources of assimilable nitrogen, minerals and other growth factors which are contained in the aqueous phase. Urea is the preferred source of organic nitrogen although other materials such as corn steep liquor, soybean meal hydrolysate, amino acids and peptones may be used. It is, of course, well known that certain vitamins and mineral cations and anions are beneficial to the growth of yeasts. A stock trace element and vitamin solution is used which conveniently provides the proper amount and balance of these important substances.

While any form of aerobic incubation is satisfactory, controlled aeration is preferred, as for example, agitation of the medium under air, or sparging of air through the medium. Since the hydrocarbon is immisible in the aqueous phase, it is desirable to maintain it in a finely dispersed form in the aqueous medium during the fermentation, thus insuring that a large surface of the hydrocarbon will be in contact with the aqueous phase. In this manner there will be optimum contact between the yeast cells, the aqueous phase and the hydrocarbon. A preferred means of accomplishing these objectives is submerged areobic fermentation, rapidly stirring the mixture while simultaneously passing air through it, e.g., by sparging.

The usual incubation conditions of time and temperature known in the art for growing yeasts, about 20 to 34° C. for about 4 to 9 days, may be employed. For the fermentation process of this invention, the final production stage in stirred fermenters is conducted for about 8 to 9 days at 24–25° C.

For the fermentation process involving the use of stirred fermenters, initial cell propagation is run in several stages. A standard inoculum is prepared from an aqueous suspension of cells from a slant of *Candida lipolytica* ATCC No. 20297 which is used to inoculate an aqueous nutrient medium containing glycerol, beef extract, yeast extract and peptone. After incubation with agitation for about 20 hours at 28° C., the resulting culture growth is used to inoculate Erylenmeyer flasks containing an aqueous nutrient medium plus an assimilable hydrocarbon such as n-hexadecane. After incubation for about 48 hours at 24 to 28° C., aliquots of the resultant growth are used to inoculate Fernbach flasks containing a hydrogen-aqueous nutrient medium. After incubation with agitation at 24 to 28° C. for about 72 hours, a portion of the culture growth is transferred to each of a number of stirred fermenters containing an aqueous nutrient medium plus the desired assimilable hydrocarbon or mixture of hydrocarbons. The fermenters, stirred at 650 to 1750 r.p.m. and sparged with 2 to 8 liters of sterile air per minute, are incubated at 24–25° C. for about 8 to 9 days.

The amount of inoculum used in the various growth stages is dependent to some extent on the heaviness of cell growth. About a 5% inoculum of good cell growth is generally satisfactory for each production stage.

The D-mannitol, D-arabitol and i-erythritol concentrations in the fermentation broth and recovery stages are estimated by a combination of colorimetry and thin-layer chromatography. The total polyol content is assayed by a modification of Bailey's colorimetric procedure described in J. Lab. Clin. Med., 54, 158 (1959). The concentrations of i-erythritol and D-arabitol are visually approximated following thin-layer chromatography—cellulose F as adsorbent, acetone:water (85:15) as developing solvent system, and p-anisidine followed by periodate as spray reagents for visualization.

The D-mannitol is recovered from the whole fermentation broth by passing the broth through a centrifugal disc separator to remove first the yeast cells and then the residual hydrocarbon from the aqueous phase. The turbid aqueous phase is sparkled by filtration and then deionized by successive passage through weak anion, strong cation and weak anion exchangers. The clarified, deionized broth is then concentrated under reduced pressure to a 25% w./v. solution, and allowed to crystallize under refrigeration. The crystalline D-mannitol is removed by filtration or centrifugation, and additional crops of crystals obtained by further concentration of mother liquors.

It is to be understood that the process of this invention also embraces the use of mutants or variants of the *Candida lipolytica* strain as produced by various chemical and physical means. Such mutants are produced by X-rays, UV irradiation, treatment with nitrogen mustards or organic peroxides and other similar techniques well known to those skilled in the art. In addition, the use of subcultures, natural mutants, recombinants, variants and the like is contemplated in carrying out the process of the present invention.

The following examples are provided to illustrate the present invention, but not to limit its scope.

CULTURE MAINTENANCE (a) *Candida lipolytica* ATCC No. 20297 is preserved by lyophilizing cells in a mixture of skimmed milk and bovine blood serum.

(b) Working stocks are prepared by periodic sub-culture on slants (25 x 150 mm. containing 17 ml. agar) using as a medium: 0.5% glucose, 0.3% beef extract, 0.5% yeast extract, 3.0% peptone and 2% agar.

PREPARATION OF STANDARD INOCULUM

A slant of *Candida lipolytica* ATCC No. 20297 is washed with 20 ml. sterile distilled water. A 0.2 ml. portion of the resulting cell suspension is used to inoculate 10 ml. of medium "A" (1% glycerol, 0.3% beef extract, 0.3% yeast extract and 0.5% peptone). Tubes (25 x 150 mm.) containing 10 ml. of medium and inoculum are incubated with agitation for 20 hours at 28° C. The resulting culture growth is referred to as standard inoculum.

PRODUCTION BASAL MEDIUM "B"

This medium is formulated to contain per liter: 2.0 g. urea, 1.0 g. $(NH_4)_2SO_4$, 1.0 g. $CaSO_4 \cdot 2H_2O$, 0.5 g. $(NH_4)_2SO_4$, 0.5 g. $K_2SO_4$, 0.25 g. $MgSO_4 \cdot 7H_2O$, 2.5 mg. $FeSO_4 \cdot 7H_2O$, 10 mg. $MnSO_4 \cdot H_2O$, 500 mcg. thiamine hydrochloride and 1.0 ml. trace minerals. The bulk of the medium is adjusted to pH 3.5 and sterilized by autoclaving (urea is sterilized and added separately). The trace element solution (1.0 ml.) provides 1.0 mg. $CaCl_2 \cdot 2H_2O$ and 100 mcg. each of $CuSO_4 \cdot 5H_2O$, $CoCl_2 \cdot 6H_2O$, $ZnSO_4 \cdot 7H_2O$, $(NH_4)_6Mo_7O_{24} \cdot 4H_2O$ and $Na_2B_4O_7 \cdot 10H_2O$.

EXAMPLE I

The cells in standard inoculum are washed twice with water and resuspended in water such that the final cell concentration is approximately 10 mg./ml. Flasks containing 20 ml. medium "B" and 4 ml. n-hexadecane (ASTM grade) are inoculated with 1.0 ml. of the above cell suspension. Flasks are incubated 9 days at 24–25° C. on a gyrotary shaker. The aqueous portion of the broth is separated from the cells and from the residual hydrocarbon by centrifugation. The aqueous solution is shown by colorimetry and thin-layer chromatography to contain 34 mg./ml. D-mannitol, <1 mg./ml. D-arabitol and 3 mg./ml. i-erythritol.

EXAMPLE II

1st growth stage.—300 ml. Erlenmeyer flasks each containing 8 ml. medium "A," 12 ml. medium "B" and 4 ml. n-hexadecane are inoculated with 1.0 ml. portions of standard inoculum and incubated at 24° C. on a gyrotary shaker for 48 hours.

2nd stage growth.—Fernbach flasks containing 20 ml. medium "A," 380 ml. medium "B" and 80 ml. mixed paraffins (8% $n-C_{14}H_{30}$, 72% $n-C_{15}H_{32}$, 15% $n-C_{16}H_{34}$) are inoculated with 20 ml. portions of 1st stage growth and incubated at 24° C. on a gyrotary shaker for 72 hours.

Production stage.—Four liter stirred fermenters containing 2000 ml. medium "B" and 400 ml. mixed paraffins (as above) are inoculated with 100 ml. 2nd stage growth and incubated at 24–25° C. for 212 hours. Each fermenter is stirred at 1750 r.p.m. and sparged with 2 liters of sterile air per minute.

Recovery.—Pooled whole broth is passed through a centrifugal disc separator to remove the yeast cells and residual hydrocarbon. The turbid aqueous phase is sparkled by filtration and then deionized by successive passage through weak anion, strong cation and weak anion exchangers. Sixteen liters of clarified, deionized broth containing 12.5 mg./ml. D-mannitol is concentrated under reduced pressure to a 25% w./v. solution and allowed to crystallize under refrigeration. The first crop of crystalline D-mannitol weighs 41 grams. On recrystallization from water these crystals have a melting point of 168° C. (corrected), which is not depressed when mixed with an authentic sample of D-mannitol. Additional crops of crystals of D-mannitol are obtained by concentrating the mother liquors.

EXAMPLE III

The process of Example II is repeated replacing the mixture of n-paraffins in the final fermenter medium with a mixture of the same weight (comprising equal portions) of the following hydrocarbons: n-dodecane, n-tridecane, n-pentadecane, n-hexadecane and n-octadecane, with comparable results.

EXAMPLE IV

Standard inoculum, 1st stage growth and 2nd stage growth are prepared as described in Example II except that all incubation temperatures are 28° C. An inoculum of 480 ml. of 2nd stage growth is used to inoculate each of several 14 liter New Brunswick fermenters, each containing 7 liters medium "B" plus 1400 ml. mixed paraffins (as described in Example II). The fermenters are maintained at 25° C. by external cooling, sparged with 8 liters of air per minute and agitated at 650 r.p.m. After 212 hours incubation, the broth contains 12 mg./ml. D-mannitol which is recovered by the method of Example II.

We claim:
1. A process for producing D-mannitol which comprises fermenting *Candida lipolytica* ATCC No. 20297 in an aqueous nutrient medium containing at least one normal paraffin having from about 12 to 18 carbon atoms as the principal source of assimilable carbon.
2. The process of claim 1 wherein the fermentation is conducted for between 8 and 9 days.
3. The process of claim 1 wherein the initial inoculum is prepared by growing *Candida lipolytica* ATCC No. 20297 in an aqueous nutrient medium for about 20 hours at 28° C.
4. The process of claim 1 wherein said D-mannitol is recovered directly from clarified and deionized fermentation broth.

References Cited
UNITED STATES PATENTS
3,257,289   6/1966   Champagnat et al. ____ 195—182

OTHER REFERENCES
Chemical Abstracts, vol. 70, 36425b, 1969.

ALVIN E. TANENHOLTZ, Primary Examiner

U.S. Cl. X.R.
195—82

PO-1050
(5/69)

UNITED STATES PATENT OFFICE
CERTIFICATE OF CORRECTION

Patent No. 3,736,229         Dated  May 29, 1973

Inventor(s) John R. De Zeeuw, Edward J. Tynan, III

It is certified that error appears in the above-identified patent and that said Letters Patent are hereby corrected as shown below:

Col. 2, line 11, change "areobic" to --aerobic--;

Col. 2, line 19, change "both" to --broth--;

Col. 2, line 55, change "areobic" to --aerobic--;

Col. 2, line 70, change "Erylenmeyer" to --Erlenmeyer--;

Col. 3, line 3, change "hydrogen" to --hydrocarbon--;

Col. 3, line 74, change "$(NH_4)_2SO_4$" to --$(NH_4)_2HPO_4$--.

Signed and sealed this 5th day of February 1974.

(SEAL)
Attest:

EDWARD M. FLETCHER, JR.         RENE D. TEGTMEYER
Attesting Officer               Acting Commissioner of Patents